3,652,702
Patented Mar. 28, 1972

3,652,702
PROCESS FOR PRODUCING ISOPRENE
Nobuyoshi Hara, TBR Bldg. 10—10, 2-chome, Nagata-cho, Chiyoda-ku, Tokyo, Japan
No Drawing. Filed Mar. 20, 1970, Ser. No. 21,531
Int. Cl. B01j 11/82; C07c 1/00, 1/20
U.S. Cl. 208—681        9 Claims

ABSTRACT OF THE DISCLOSURE

A one-step process for producing isoprene by reacting isobutylene and formaldehyde is effected by use of a boric acid catalyst.

BACKGROUND OF THE INVENTION

Field of the invention

This invention relates to a novel process for producing isoprene and more particularly to a method involving the reaction of isobutylene with formaldehyde in a one-step vapor phase condensation technique.

Description of prior art

It has been known to produce isoprene by a two-step reaction process as follows:

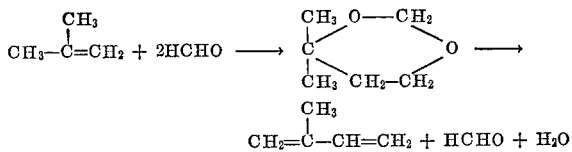

which is called the IFP Process.

In the first step of the IFP Process, m-dioxane is synthesized in a liquid phase process using sulfuric acid as the catalyst. In the second step, the m-dioxane is decomposed at high temperatures in the vapor phase. The IFP Process, however, has the disadvantage of producing various byproducts, in the first step, which are difficult to separate and hence, this two-step procedure is not entirely satisfactory.

It has also been known to produce isoprene by reacting isobutylene and formaldehyde in a one-step vapor phase condensation technique as follows:

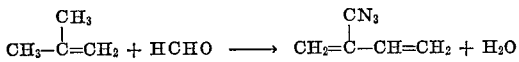

This type of reaction, however, has a number of distinct disadvantages to it. In general, because of the high reactivity of formaldehyde, it is necessary to use an excess amount of isobutylene with respect to the formaldehyde, although the theoretical molar ratio for the reaction is 1:1. Although the presence of water improves the selectivity based on formaldehyde for producing isoprene and accordingly, an aqueous solution of formaldehyde is usually used in this process, it is still necessary to maintain the molar ratio of isobutylene to formaldehyde at more than about 4.

This type of prior art one-step reaction also requires the use of a catalyst such as active acid clay, silica-alumina, a metal phosphate or sulphate, phosphoric acid-silica gel, or a metal oxide-silica gel. However, there are many disadvantages inherent in the use of such catalysts. The selectivity of the reaction based on isobutylene for producing isoprene is usually greater than 98%. In contradistinction, the selectivity based on formaldehyde for producing isobutylene is usually lower than 60%. While the proper selection of reaction conditions may increase the selectivity based on the formaldehyde to about 80%, under these conditions, the single pass yield of isoprene is decreased to such a low point that the volume of recycle materials becomes too high for suitable industrial operation.

The reason for the very low selectivity of the reaction based on formaldehyde is that due to the presence of the catalyst, formaldehyde tends to undergo certain undesirable side reactions, including decomposition to hydrogen and carbon monoxide, according to the mechanism of (a)    $HCHO \rightarrow H_2 + CO$ This side reaction is usually higher during the initiation period of the reaction when the activity of the catalyst is high and the selectivity for producing isoprene usually increases with the elapse of time. During the initial stages of the reaction, most of the formaldehyde is decomposed, and the byproduction of isopentene and propylene is produced as an undesirable byproduct as a result of the disproportionation of isobutylene (b) and by partial hydrogenation of isoprene (c) according to the following mechanisms:

(b) 

(c) 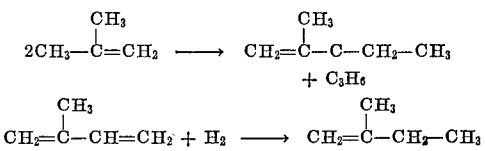

wherein two types of isopentene isomers are produced, except 2-methyl-1-butene.

At the start of the reaction, the side reactions (a), (b), and (c) dominates the main reaction and the production of isoprene is quite small. The major product during this initial period is therefore hydrogen, carbon monoxide, isopentenes and propylene. When using certain catalysts, this initial reaction period may be as long as one or two hours during which very little isoprene is produced.

In order to disclose the present invention, the following definitions are employed in this description:

Selectivity based on formaldehye $$= \frac{\text{isoprene produced (mole)}}{\text{formaldehyde converted (mole)}} \times 100\%$$

The selectivity based on formaldehyde shows the mole percent of isoprene to the quantity of formaldehyde converted and is the most improtant factor for evaluating catalyst efficiency.

The one pass yield of isoprene shows the mole percent of isoprene produced in one pass against the quantity of formaldehyde supplied, and is the base for evaluating the activity of the catalyst.

A high value of selectivity based on formaldehyde shows a very low degree of side reactions which means that the formaldehyde is effectively being used for producing isoprene. In the industrial process, the unconverted materials are recycled after recovery and accordingly, the selectivity based on formaldehyde corresponds to the actual yield of isoprene in the industrial process.

It is preferable in an industrial process to use a catalyst which gives a very high selectivity based on formaldehyde (less byproduct), yet which will also provide as high a one pass yield of isoprene (actual yield of isoprene per unit time), as possible.

SUMMARY OF THE INVENTION

One object of this invention, therefore, is to provide a novel process for obtaining a high yield of isoprene.

Another object of the present invention is to provide a high selectivity based on formaldehyde, as well as a high single pass yield of isoprene.

In accordance with the present invention, boric acid is used as the main catalyst in the process for producing isoprene by reacting formaldehyde and isobutylene at high temperatures in the vapor phase.

DETAILED DESCRIPTION OF PREFERRED EMBODIMENTS

A mixture of isobutylene and less reactive materials, such as isomers of butene or propylene can be used as the isobutylene source. An aqueous solution of formaldehyde can be used as a formaldehyde source, and the concentration of formaldehyde can be selected from 100% to 1% and preferably from 50% to 5% should be used. An excess of isobutylene should be used (molar ratio of formaldehyde to isobutylene may be between 1:3 and 1:8) and the isobutylene and aqueous solution of formaldehyde should be reacted under high temperatures, such as about 200° to 400° C. in the vapor phase and under atmospheric pressure or elevated pressure. The unconverted isobutylene and formaldehyde may be recovered and recycled.

The catalyst used for the present invention is usually produced by using an inert carrier such as silica gel, diatomaceous earth and pumice. A typical process for producing the catalyst is to impregnate a boric acid solution into the inert carrier and to evaporate the solution to dryness. The catalyst is then ignited at high temperatures, such as 250° C. or higher. A small amount of phosphoric acid can be used as an auxiliary catalyst, but if so used, it should be present in an amount of less than about 80 mole percent based on the boric acid, and preferably less than 50 mole percent based on the boric acid. The phosphoric acid can be added to the boric acid solution, or it can be used separately from the boric acid solution in preparation of the catalyst.

Various types of boric acids can be used, such as $H_3BO_3$, $HBO_2$, and $B_2O_3$. $HBO_2$ and $B_2O_3$ are usually converted into $H_3BO_3$ in the presence of water. The addition of phosphoric acid may enhance the selectivity based on formaldehyde and the improvements may become especially significant with the lapse of time. An excess of phosphoric acid to boric acid, however, (more than 80 mole percent), may cause the production of $BPO_4$ or the production of excess free phosphoric acid, so that the selectivity based on formaldehyde may be decreased. In this reaction, $BPO_4$ and phosphoric acid may cause a high catalyst activity so as to produce isoprene, but it may cause a low selectivity based on formaldehyde, because the decomposition of formaldehyde and the production of the byproduct isopentene becomes high. The free boric acid, however, may cause a high degree of catalytic activity with less formaldehyde decomposition, so that a significantly higher selectivity based on formaldehyde (more than 80 mole percent) can be obtained and a high one pass yield of isoprene (43 to 68 mole percent) can also be obtained.

The amount of boric acid coated on the inactive carrier, such as silica gel, depends primarily on the surface characteristics of the carrier. It should be used in an amount sufficient to cover all of the carrier surface for best results.

In order to effect the vapor phase reaction, high temperatures which are sufficient to vaporize the compounds should be used, preferably between 200° and 400° C.

Where known catalysts are used in the process, the selectivity based on formaldehyde is usually low (25 to 65 mole percent) because the byproduct of isopentene and large quantities of hydrogen and carbon monoxide compete with the main reaction. When using catalysts which produce a high selectivity based on formaldehyde (65 to 80 mole percent), the one pass yield of isoprene is too low (less than 25 mole percent). Heretofore, using conventional catalysts, no one has been able to obtain a high selectivity based on formaldehyde as well as a high one pass yield of isoprene. The advantage of the present invention, therefore, is to provide far less decomposition of formaldehyde so that the selectivity based on formaldehyde can be increased, even as high as 80 to 98 mole percent or higher. Since no isopentene is produced, the purity of isoprene produced by the present invention approaches 100%. Also, since there is very little side reaction, the selectivity based on isobutylene for producing isoprene also approaches 100%. In using the catalyst of the present invention, it is now possible to obtain a significantly higher selectivity based on formaldehyde as well as a significantly higher single pass yield of isoprene as follows:

|   | Mole percent |
|---|---|
| (a) Selectivity based on isobutylene | 99.9–100 |
| (b) Selectivity based on formaldehyde | 80–88 |
| (c) Isoprene single pass yield | 68–43 |
| (d) Isopentene (and polymeric) byproducts | 0 |

Where the single pass yield of isoprene is about 30%, the selectivity based on formaldehyde is more than 98 mole percent. The other advantage of the present invention is that isoprene is produced at a very high purity approaching 100%, because almost no byproduct isopentene is produced by the present invention.

EXAMPLES

Catalyst A (boric acid to silica gel)

100 g. of silica gel produced by a wet process was impregnated with a hot aqueous solution of 33.5 g. of boric acid and was evaporated to dryness to make a boric acid coated silica gel carrier.

Catalyst B (boric acid-phosphoric acid-silica gel)

100 g. of silica gel produce by a wet process was impregnated a hot aqueous solution of 24.8 g. of boric acid and 19.6 g. of phosphoric acid and was evaporated to dryness to make a boric acid coated carrier having a boric acid to phosphoric acid mole ratio of 2:1.

Catalyst C (boric acid-phosphoric acid-silica gel)

In this instance, excess phosphoric acid was used with respect to the boric acid and accordingly, this catalyst is outside the scope of the invention. 100 g. of silica gel produced by a wet process was impregnated with a hot aqueous solution of 12.5 g. of boric acid and 19.6 g. of phosphoric acid and dried to produce a boric acid-phosphoric acid coated carrier. The molar ratio of boric acid to phosphoric acid is 1:1.

In producing isoprene, the temperature of the reaction was maintained at 300° C. and the molar ratio of isobutylene to formaldehyde was 6:1. The catalyst weight to the total mole of raw materials per hour was 17 g. per mole per hour. A 20 weight percent aqueous solution of formaldehyde was used. Prior to using the catalysts, they were ignited at 350° C. for 2 hours. The isobutylene and formaldehyde were then reacted in a one-step vapor phase condensation technique in the presence of each of the above catalysts under the indicated conditions. The result of this reaction is shown in the following table:

TABLE 1.—PRODUCTION OF ISOPRENE

|   | Catalyst (mole percent) | | |
|---|---|---|---|
|   | A | B | C |
| Formaldehyde conversion: | | | |
| 1 hour reaction | 85 | 85 | |
| 5 hour reaction | 54 | 49 | 75 |
| Isoprene one pass yield: | | | |
| 1 hour reaction | 68 | 68 | |
| 5 hour reaction | 43 | 43 | 48 |
| Selectivity based on formaldehyde: | | | |
| 1 hour reaction | 80 | 80 | |
| 5 hour reaction | 79 | 88 | 64 |
| 4–5 hour reaction | 72 | 98 | |
| Isopentene by-product, 5 hour reaction | 0 | 0 | 1.5 |
| $H_2$ plus CO by-product, 5 hour reaction | 12 | 6 | 27 |

NOTES:
1. Isoprene one pass yield is the data based on formaldehyde supplied.
2. Selectivity based on formaldehyde is the data based on formaldehyde converted and corresponds to the actual yield of isoprene with recycle of unconverted materials.

3. Where catalyst C is employed, the production of $BPO_4$ is too high and accordingly, the side reactions producing hydrogen and carbon monoxide is too high. Also, the selectivity is too low, even though the isoprene single pass yield is rather high. Where $BPO_4$ produced by the reaction of boric acid and phosphoric acid is added to the silica gel, the catalyst activity and selectivity are decreased still further.

In order to show the unpredictable and unique effectiveness of the present invention, the best results stated in the prior art are listed together with the result of the reaction using Catalyst B.

TABLE 2

| Catalyst | Mole percent | | |
|---|---|---|---|
| | Conversion of FA [1] | Selectivity to FA [1] | One pass yield of IP [2] |
| This invention—$H_3BO_4$/silica gel plus ½ molar ratio of $H_3PO_4$ as promoter: | | | |
| 1 hour reaction | 85 | 80 | 68.0 |
| 5 hour reaction | 49 | 88 | 43.0 |
| Prior art: | | | |
| Acid clay, unknown reaction time | 80 | 53 | 42.4 |
| $CaCl_2$-HCl/silica, 4 hour reaction | 65 | 62 | 39.3 |
| $CdCl_3$-NCl/silica, 4 hour reaction | 74 | 58 | 42.9 |
| $Cr_2O_3$-$H_3PO_4$/silica, 4 hour reaction | 79 | 51 | 40.3 |
| $BPO_4$/silica: | | | |
| 4 hour reaction | 49 | 53 | 26.0 |
| Unknown reaction time | 34 | 57 | 19.4 |
| $H_3PO_4$/silica, 4 hour reaction | 32 | 50 | 16.0 |
| $Mg(OH)_2$-$H_3PO_4$/silica, unknown reaction time | 22 | 75 | 16.5 |
| $Ca_3(PO_4)_2$/silica, unknown reaction time | 22 | 79 | 17.4 |

[1] Formaldehyde.
[2] Isoprene.
NOTE: The one pass yield of IP is calculated as conversion of FA X selectivity to FA.

Having fully described the invention, it will be apparent to one having ordinary skill in the art that many changes and modifications can be made to the invention without departing from the spirit or scope thereof. Accordingly, what is claimed and intended to be covered by Letters Patent is:

1. A process for producing isoprene which comprises reacting isobutylene with formaldehyde at an elevated temperature sufficient to vaporize the reactants and in the presence of a boric acid catalyst consisting essentially of boric acid.

2. The process of claim 1 wherein the reaction is effected at a temperature of between 200° and 400° C.

3. The process of claim 1 wherein the molar ratio of formaldehyde to isobutylene is from about 1:3 to 1:8.

4. The process of claim 1 wherein said boric acid catalyst is formed by impregnating an inert carrier with an aqueous solution of boric acid and thereafter drying said impregnated catalyst.

5. The process of claim 4 wherein said inert catalyst is selected from the group consisting of silica gel, diatomaceous earth, and pumice.

6. The process of claim 4 wherein said dried impregnated catalyst is ignited at a temperature of at least 250° C. prior to use.

7. A process for producing isoprene which comprises reacting isobutylene with formaldehyde at an elevated temperature sufficient to vaporize the reactants and in the presence of a boric catalyst consisting essentially of boric acid and phosphoric acid wherein said phosphoric acid is present in an amount of less than about 80 mole percent, based on the boric acid.

8. The process of claim 7 wherein the boric acid and phosphoric acid is impregnated into an inert carrier.

9. The process of claim 1 wherein the boric acid is impregnated into an inert carrier.

References Cited

UNITED STATES PATENTS

| 3,255,238 | 6/1966 | Roelen et al. | 252—432 |
|---|---|---|---|
| 3,282,946 | 11/1966 | Campbell et al. | 252—432 |
| 3,210,338 | 10/1965 | Huber et al. | 260—239.3 |
| 3,142,712 | 7/1964 | Valet et al. | 260—681 |
| 3,056,845 | 10/1962 | Bennett et al. | 260—681 |
| 3,146,278 | 8/1964 | Habeshan et al. | 260—681 |

DELBERT E. GANTZ, Primary Examiner
G. E. SCHMITKONS, Assistant Examiner

U.C. Cl. X.R.
252—432